BEST AVAILABLE COPY

T857035

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 17, 1968

856 O.G. 697

714,283

PROCESS AND APPARATUS FOR BEAMING YARNS

Karel Murenbeeld, Geneva, Switzerland, assignor to E. I. du Pont de Nemours and Company, Wilmington, Del., a corporation of Delaware

Filed Mar. 19, 1968. Published Dec. 17, 1968

Class 28—36

3 Sheets Drawing. 19 Pages Specification

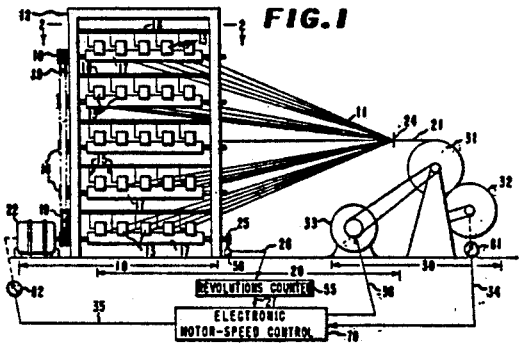

A process and apparatus for beaming packages of elastomeric yarns wherein the yarn on the packages varies in elongation along its package length. The substantially constant beaming elongation normally employed in beaming elastomeric yarns is varied in an inverse relationship with respect to elongation of the yarn along its package length. The beaming apparatus includes a conventional creel and warper arrangement for beaming elastomeric yarns with separate drive motors for the creel and warper. The motors are coupled by a speed control means, the output of which is modified by a programmed control system to vary the warper speed in accordance with the length of yarn unwound from the creeled yarn packages.

United States Patent Office

PTO - BOYERS, PA Duty Station

MISSING PAGE TEMPORARY NOTICE

PATENT # T857035 FOR ISSUE DATE 12-17-1968

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

Drawing Sheets 1, 2, & 3

N/A at Boyers
6/1/94

Data Conversion Operation

Boyers, Pa